(12) United States Patent
Kordik et al.

(10) Patent No.: US 9,331,797 B2
(45) Date of Patent: May 3, 2016

(54) RF RECEIVER WITH TESTING CAPABILITY

(71) Applicant: Infineon Technologies AG, Neubiberg (DE)

(72) Inventors: Klemens Kordik, Linz (AT); Rainer Stuhlberger, Puchenau (AT)

(73) Assignee: Infineon Technologies AG, Neubiberg (DE)

( * ) Notice: Subject to any disclaimer, the term of this patent is extended or adjusted under 35 U.S.C. 154(b) by 42 days.

(21) Appl. No.: 14/493,610

(22) Filed: Sep. 23, 2014

(65) Prior Publication Data

US 2016/0087734 A1    Mar. 24, 2016

(51) Int. Cl.
*H04B 17/00* (2015.01)
*H04B 17/29* (2015.01)
*H04B 17/23* (2015.01)

(52) U.S. Cl.
CPC ............. *H04B 17/29* (2015.01); *H04B 17/23* (2015.01)

(58) Field of Classification Search
CPC ................................ H04B 17/29; H04B 17/23
USPC ..................................................... 455/67.14
See application file for complete search history.

(56) References Cited

U.S. PATENT DOCUMENTS

| | | | | |
|---|---|---|---|---|
| 5,059,892 A * | 10/1991 | Stoft | ............... | G01R 1/20 324/73.1 |
| 2002/0021468 A1* | 2/2002 | Kato | ............... | H04B 10/299 398/135 |
| 2004/0148580 A1* | 7/2004 | de Obaldia | ............ | H04B 17/29 714/715 |
| 2008/0278370 A1* | 11/2008 | Lachner | ............... | G01S 7/03 342/200 |
| 2009/0125772 A1* | 5/2009 | Yin | ............... | H03B 19/14 714/738 |
| 2009/0153158 A1* | 6/2009 | Dunn | ............... | G01R 31/2822 324/762.01 |
| 2011/0273197 A1* | 11/2011 | Banerjee | ............ | G01R 31/3167 324/750.3 |
| 2013/0021048 A1* | 1/2013 | Peng | ............... | G01R 31/2884 324/750.3 |
| 2013/0217343 A1* | 8/2013 | Tenbroek | ............ | H04W 24/00 455/77 |
| 2014/0154997 A1* | 6/2014 | Chen | ............... | H04B 17/29 455/67.14 |

* cited by examiner

Primary Examiner — April G Gonzales
(74) Attorney, Agent, or Firm — Eschweiler & Associates, LLC

(57) ABSTRACT

An RF receiver device includes a semiconductor chip in a chip package, and a test signal generator integrated in the chip. The test signal generator generates an RF test signal including first information. An RF receiver circuit integrated in the chip receives an RF input signal, down-converts the RF input signal into an intermediate frequency (IF) or base band, and digitizes the down-converted signal to obtain a digital signal. An RF receive channel includes a coupler having first and second input ports and an output port. The output port is coupled to the input of the RF receiver circuit, the first input port receives an antenna signal and the second input port receives the test signal from the test signal generator. A signal processor is integrated in the chip and determines, during a test cycle, whether the first information in the digital signal matches a predetermined criterion.

16 Claims, 3 Drawing Sheets

US 9,331,797 B2

RF RECEIVER WITH TESTING CAPABILITY

FIELD

The present disclosure relates to the field of radio frequency (RF) transmitter or transceiver circuits, particularly to an RF receiver chip including testing capability.

BACKGROUND

Radio frequency (RF) receivers and transceivers can be found in numerous applications, particularly in the field of wireless communications and radar sensors. In the automotive sector, there is an increasing demand for radar sensors used in so-called "adaptive cruise control" (ACC) or "radar cruise control" systems. Such systems may be used to automatically adjust the speed of an automobile so as to maintain a safe distance from other automobiles ahead.

Modern radar systems make use of highly integrated RF circuits, which may incorporate all core functions of an RF font-end of a radar transceiver in one single package (single chip transceiver). Such RF front-ends usually include, inter alia, a voltage controlled oscillator (VCO), power amplifiers (PA), mixers, and analog-to-digital converters (ADC).

Radar applications used in automobiles are subject to various standards concerning road traffic safety, for example the functional safety standard ISO 26262 titled "Road vehicles—Functional safety". To ensure the functional safety of a radar sensor, it is important to know whether the current state of the radar sensor allows a reliable distance and speed measurement. However, also in applications different from radar, reliability may be an issue.

Thus there is a need for RF transceivers having improved self-test capability to increase the reliability of the overall system.

SUMMARY

An RF receiver device is disclosed herein. In accordance with one example of the disclosure the receiver device comprises a chip package, a semiconductor chip included in the chip package, and a test signal generator, which is also integrated in the semiconductor chip. The test signal generator is configured to generate an RF test signal that includes first information. Furthermore, an RF receive channel includes an RF receiver circuit that is integrated in the semiconductor chip. The RF receiver circuit has an input for receiving an RF input signal and is configured to down-convert the RF input signal into an intermediate frequency (IF) or base band and to digitize the down-converted signal to obtain a digital signal. Moreover, a coupler is integrated in the chip package. The RF receive channel further includes a coupler, which has a first and a second input port and an output port, wherein the output port is coupled to the input of the RF receiver circuit, the first input port is configured to receive an antenna signal and the second input port is coupled to the test signal generator to receive the test signal. A signal processor is integrated in the semiconductor chip and configured to determine, during a test cycle, whether the first information present in the digital signal match a predetermined criterion.

In accordance with another example of the disclosure the receiver device comprises a chip package, a semiconductor chip included in the chip package, and a test signal generator integrated in the semiconductor chip. The signal generator is configured to generate an RF test signal including first information. The receiver device further includes at least two RF receive channels. Each RF receive channel comprises an RF receiver circuit integrated in the semiconductor chip and having an input for receiving a respective RF input signal. The RF receiver circuit of each channel is configured to down-convert the respective RF input signal into an intermediate frequency (IF) or base band and to digitize the down-converted signal thus providing a digital signal. Each RF receive channel further includes a coupler, which is integrated in the chip package and which has a first and a second input port and an output port, wherein the output port is coupled to the input of the RF receiver circuit of the respective RF receive channel. The first input port is configured to receive a respective antenna signal and the second input port is coupled to the test signal generator to receive the RF test signal. The RF receiver device further comprises a signal processor integrated in the semiconductor chip, wherein the signal processor is configured to determine, during a test cycle, whether the first information present in the digital signals obtained from the RF receive channels match respective criteria.

BRIEF DESCRIPTION OF THE DRAWINGS

The disclosure can be better understood with reference to the following drawings and descriptions. The components in the figures are not necessarily to scale; instead emphasis is placed upon illustrating the principles of the disclosure. More-over, in the figures, like reference numerals designate corresponding parts. In the drawings.

DETAILED DESCRIPTION

Embodiments of the present disclosure are discussed below in the context of a radar transceiver. It should be noted, however, that the present disclosure may also be applied in applications different from radar such as, for example, RF transceivers of RF communication devices.

Figure 1:
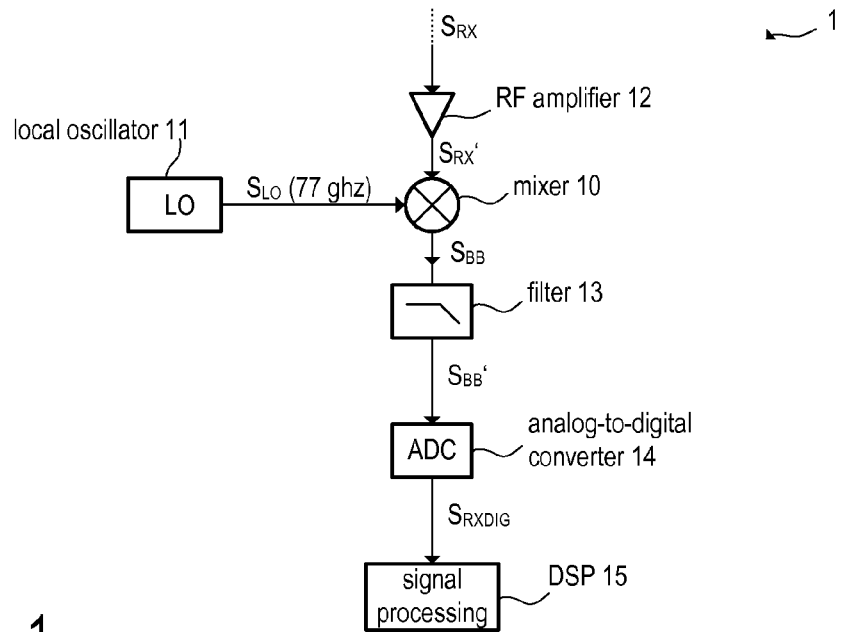
FIG. 1 is a block diagram illustrating the basic structure of the receive path of a RF transceiver chip.

A so-called "single chip radar" may include circuitry providing the core functions needed for distance and/or velocity measurement in one chip. Thus the chip may include, inter alia, RF oscillators, amplifiers, mixers, filters, analog-to-digital converters, and digital signal processors. FIG. 1 illustrates the receive path of an RF transceiver 1 (or an RF receiver) as used, for example, in a radar distance measurement device. Accordingly, the RF transceiver/receiver 1 includes a mixer 10 which is supplied with an RF input signal $S_{RX}$ and an RF oscillator signal $S_{LO}$, used to down-convert the RF input signal $S_{RX}$ into the base band or an intermediate frequency (IF) band. The RF input signal $S_{RX}$ may be provided by an antenna (not shown in FIG. 1) and may be pre-amplified (see RF amplifier 12) before being supplied to the mixer 10. In the present example, the RF oscillator signal $S_{LO}$ generated by a local oscillator (LO) 11, which may include a voltage controlled oscillator (VCO) coupled in a phase locked loop (PLL). However, the RF oscillator signal $S_{LO}$ may be provided by other circuitry dependent on the actual application. When used in a radar distance measurement device, the RF oscillator signal $S_{LO}$ may be in the range between approximately 24 GHz and 77 GHz (77 GHz in the present example). However, higher or lower frequencies may also be applicable.

As mentioned, the mixer 10 down-converts the RF input signal $S_{RX}'$ (amplified antenna signal) into the base band (or IF band). The respective base band signal (mixer output signal) is denoted by $S_{BB}$. The base band signal $S_{BB}$ is then subject to analog filtering (filter 13) to suppress undesired sidebands or image frequencies. The filter 13 may be a low-pass filter or a band-pass filter. The filtered base band signal (filter output signal) is denoted by $S_{BB}'$. Receivers which make use of a mixer to down-convert the RF input signal into the base band or an IF band are as such known as heterodyne receivers and thus not further discussed in more detail. The filtered base band signal $S_{BB}'$ is then sampled and converted to a digital signal $S_{RXDIG}$ (analog-to-digital converter 14), which is then further processed in the digital domain using. In case of a down-conversion into an IF band, the IF signal may also be digitized for a digital demodulation of the IF signal. The digital signal processing may be performed using, e.g., a digital signal processor executing appropriate software instructions.

Figure 2:
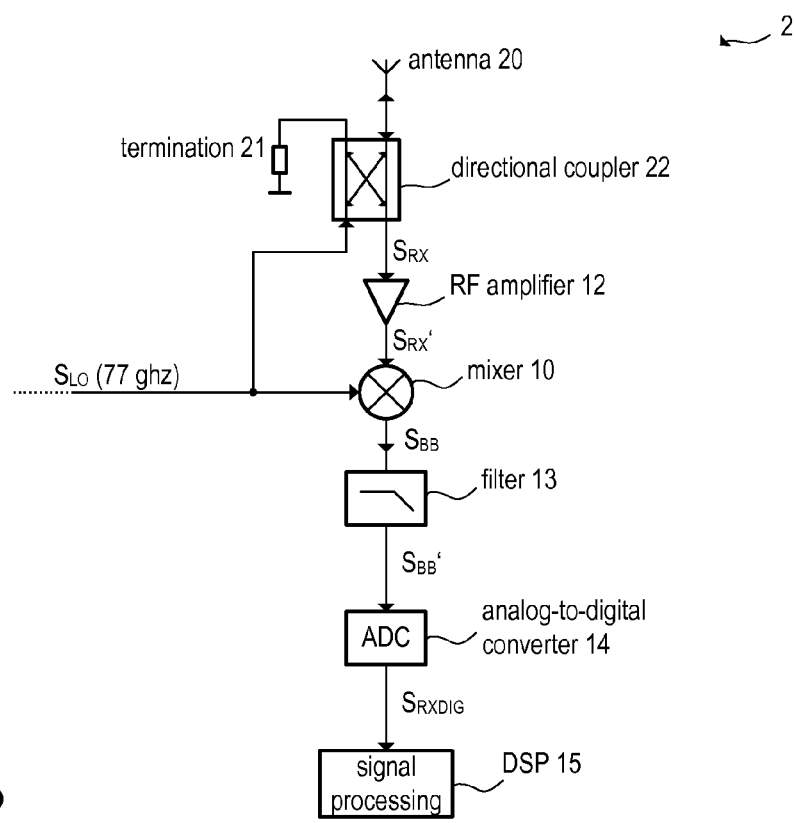
FIG. 2 is a block diagram illustrating the receive/transmit path in a monostatic radar transceiver chip.

FIG. 1 illustrates the receive path of an RF receiver or transceiver. In so-called bistatic or pseudo-monostatic radar systems the receiver may be separate from the transmitter as receiver and transmitter use separate antennas. FIG. 2 illustrates a RF transceiver (combined receiver and transmitter), which may be used in a monostatic radar system, in which the same antenna is used to transmit and receive RF signals. The transceiver of FIG. 2 includes a directional coupler 22, which is coupled between the mixer 10 and an antenna 20 and configured to direct the RF signal $S_{RX}$, received by the antenna 20 to the mixer 10 (receive path). Moreover, the directional coupler 22 is configured to direct the RF oscillator signal $S_{LO}$ to the antenna 20, which transmits a respective electromagnetic radar signal. Besides the directional coupler 22, the receive path (amplifier 12, mixer 10, filter 13, analog-to-digital converter 14, signal processor 15) is the same as in FIG. 1 and thus not repeated here.

The directional coupler 22 may be implemented as rat-race coupler formed by strip lines. However, other types of directional couplers may be used. Particularly when using a rat race coupler, one port of the coupler is terminated by a termination impedance 21. The directional coupler 22 may be implemented in the same chip package as the other circuit components of the transceiver to provide a single chip solution.

Figure 3:
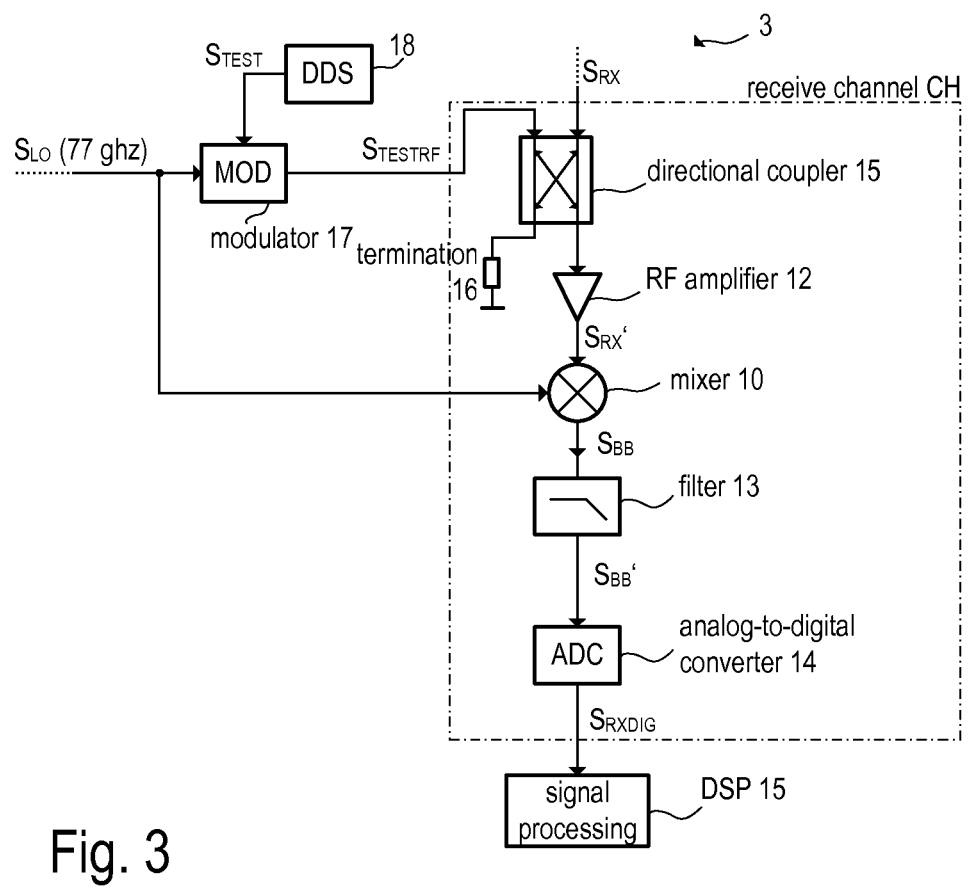
FIG. 3 is a block diagram illustrating the RF transceiver of FIG. 1 including additional circuitry for providing self-test function.

FIG. 3 is a block diagram, which illustrates an RF transceiver 3 similar to the example of FIG. 1 with additional circuitry for providing self-test function. The RF transceiver 3 receives the RF input signet $S_{RX}$ from an antenna (not shown) either via a directional coupler as shown in FIG. 2 or directly as shown in FIG. 1. The RF input signal $S_{RX}$ is directed to the mixer 10 by directional coupler 15. Like in the example of FIG. 1 the RF input signal $S_{RX}$ may be pre-amplified, wherein the amplifier 12 may coupled upstream or downstream of the directional coupler 15. In the present example, the amplifier 12 is connected between directional coupler 15 and mixer 10. The signal processing chain downstream of the mixer 10 is the same as illustrated in the example of FIG. 1. Accordingly, the output of mixer 10 is coupled to the input of filter 13 to suppress undesired sidebands or image frequencies in the base band (or IF band) signal $S_{BB}$ provided by the mixer 10. The output of filter 13 is coupled to an analog input of analog-to-digital converter 14, which is configured to digitize the filtered base band signal $S_{BB}'$. The digital representation of the filtered signal $S_{BB}'$ is denoted as $S_{RXDIG}$ and may be further processed by the digital signal processor 15. The signal processing chain from the direction coupler 15 to the analog-to-digital converter 14 is referred to as receive channel CH. A similar system with multiple receive channels is described later with respect to FIGS. 5 and 6.

The directional coupler 15 allows to apply an RF test signal $S_{TESTRF}$ to the input of mixer 10. Like the RF input signal $S_{RX}$, the RF test signal $S_{TESTRF}$ may be pre-amplified by the amplifier 12. The directional coupler may be, for example, a rat race coupler implemented using strip lines. As usual for such couplers, one port is terminated using a termination impedance 16. In essence, the RF test signal $S_{TESTRF}$ is "injected" into the receive path of the transceiver/receiver, which therefore "sees" the RF test signal $S_{TESTRF}$ like a regular RF input signal. The RF test signal $S_{TESTRF}$ may be generated using a modulator 17 which modulates the RF oscillator signal $S_{LO}$ (provided, e.g., by a local oscillator), which has a carrier frequency $f_{LO}$ (e.g., $f_{LO}=77$ GHz), with a test signal $S_{TEST}$ (modulation signal). The test signal $S_{TEST}$ may have a single frequency $f_{TEST}$ or a band-limited signal having a center frequency $f_{TEST}$. The test signal $S_{TEST}$ may be synthesized in such a manner that it represents a simulated radar echo.

Figure 4:
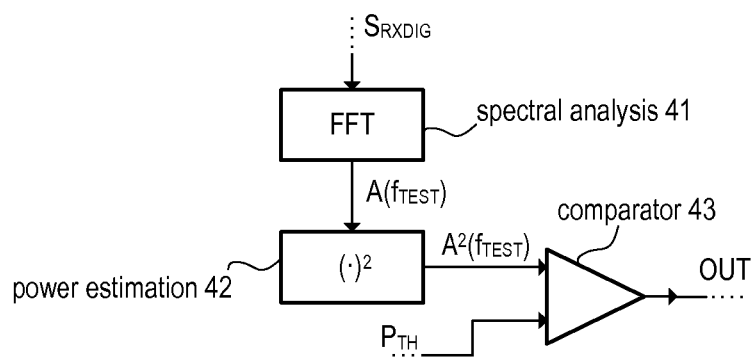
FIG. 4 illustrates one example of the signal analysis performed in a digital signal processor during a self-test of the RF transceiver of FIG. 3.

The test signal $S_{TEST}$ (modulation signal) may be generated using a direct digital synthesize (DDS), which is a type of frequency synthesizer used for creating arbitrary waveforms. FIG. 4 illustrates, by means of a block diagram, one example of evaluating (using DSP 15) the down-converted, filtered, and digitized signal $S_{RXDIG}$ to assess whether the test signal $S_{TEST}$ is present in the digital signal $S_{RXDIG}$. Accordingly, a spectral analysis of the digital signal $S_{RXDIG}$ is performed. This may be done using a Fast Fourier Transform (FFT) algorithm (labelled "spectral analysis 41" in FIG. 4) to obtain the magnitude of the signal $S_{RXDIG}$ for different frequency ranges (often referred to as "bins"). Alternatively, other algorithms (e.g., a Goertzel algorithm) may be used for determining the magnitude A(f) of one or more specific spectral components of the signal $S_{RXDIG}$. In the present example, the frequency bin including the test frequency $f_{TEST}$ of the test signal $S_{TEST}$ is considered in the subsequent signal processing. To obtain a value representing the signal power the magnitude $A(f_{TEST})$ is squared (referred to as "power estimation 42" in FIG. 4). In essence, the power spectral density (PSD) is evaluated for the test frequency $f_{TEST}$. Finally, the signal power $A^2(f_{TEST})$ at the test frequency is compared to a threshold $P_{TH}$, which represents an expected signal power of the test signal $S_{TEST}$ in case the overall signal processing chain (in particular amplifier 12, mixer 10, filter 13, ADC 14, and other intermediate components) in the receive path of the RF transceiver 3 operates in accordance with the desired specification.

In accordance with the embodiments described herein, the circuit components forming the RF receiver/transceiver as well as the circuit components needed for the self-test (particularly modulator 17, DDS 18, directional coupler 15) discussed above are integrated in the same semiconductor chip or at least in the same chip package. This allows to regularly and efficiently test the function of the signal processing chain of the receive path of the RF transceiver (or RF receiver) and to quickly detect malfunctions of components in the receive path, which may lead, for example, to unreliable or erroneous measurements. Furthermore, the single-chip solution allows to use the same signal processor for both, the regular measurement and the self-test. Particularly in radar distance and velocity sensors (also referred to as radar range sensors), measured distance or velocity values are repeatedly determined during subsequent measurement cycles. Between two subsequent measurement cycles idle cycles may be inserted, during which a self-test can be performed. A self-test producing a negative result may be communicated to a control unit, which controls the operation of the overall system and signaled to the user.

In the example described above, the power (within a specific spectral range or of a spectral line) of the digital signal $S_{RXDIG}$ is evaluated to determine whether the power matches with the power of the test signal. This concept can be generalized. Accordingly, the test signal generally includes first information (e.g. a specific power within a specific spectral range) which is transmitted via the modulator 17, the coupler 15, the mixer 10, and the ADC 14 to the signal processor. The first is thus also included in the RF test signal $S_{TESTRF}$ as well as in the mixer output signal $S_{BB}$ and the digital signal $S_{RXDIG}$. The signal processor 15 is generally configured to detect whether or not the first information is present in the digital signal $S_{RXDIG}$. In case of a positive detection the receive path operates in accordance with the desired specification. In case the detection fails, an error may be signaled as mentioned above.

Figure 5:
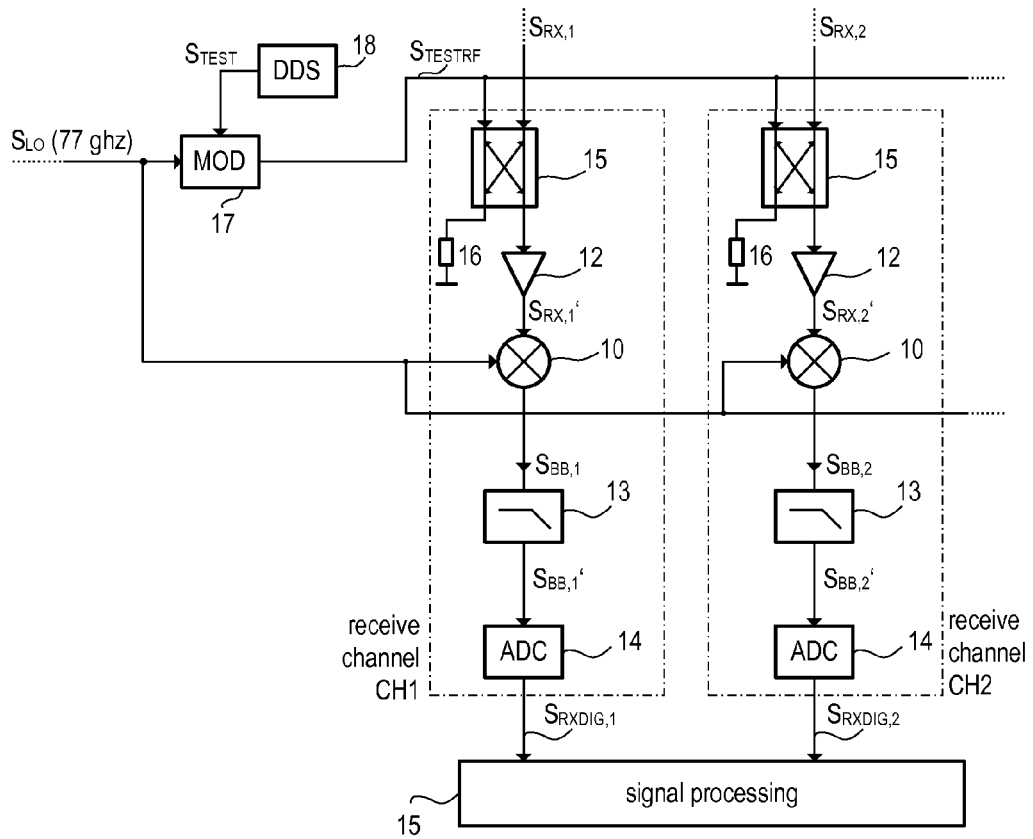
FIG. 5 is a block diagram illustrating the RF transceiver of FIG. 1 including additional circuitry for providing self-test function for multiple receiving channels.

FIG. 5 is a block diagram, which illustrates an RF transceiver 3 similar to the example of FIG. 1 with additional circuitry for providing a self-test function of two or more RF receive channels CH1, CH2, etc. The circuit of FIG. 5 is essentially the same as in the previous example of FIG. 3, wherein a directional coupler 15 (including termination 16 if necessary), an amplifier 12, a mixer 10, a filter 13, and an analog-to-digital converter 14 is provided for each individual receive channel CH1, CH2, etc. One separate antenna (see FIG. 2, antenna 20) may be associated with each channel CH1, CH2, etc., and the antenna signals $S_{RX,1}$, $S_{RX,2}$, etc. are supplied to the respective directional couplers 15. Similarly, the RF test signal $S_{TESTRF}$ is also supplied to the direction couplers 15. The analog-to-digital converter 14 of each channel CH1, CH2 provides a respective digital base band signal $S_{RXDIG,1}$, $S_{RXDIG,2}$ like in the previous example of FIG. 3. In each channel CH1, CH2, the mixers 10 receive the amplified antenna signal $S_{RX,1}'$, $S_{RX,2}'$ as well as the local oscillator signal $S_{LO}$.

As shown in FIG. 5, a single local oscillator signal $S_{LO}$ (from a single oscillator) is used to down-convert the antenna signal in each channel in order to maintain the phase relationship between the down-converted signals $S_{BB,1}$) $S_{BB,2}$) etc. For the same reason, the same RF test signal $S_{TESTRF}$ is used for each channel CH1, CH2, etc. This allows to evaluate the phases of the digital base band signal $S_{RXDIG,1}$, $S_{RXDIG,2}$ using the signal processing unit 15, which is configured to process the digital signals provided by all channels. One signal processing example is depicted in FIG. 6 as block diagram, according to which the phase differences are calculated for the digital signals $S_{RXDIG,1}$, $S_{RXDIG,2}$, etc.

Figure 6:
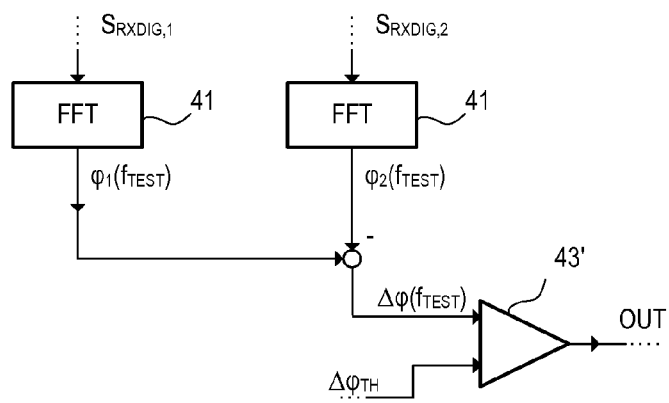
FIG. 6 illustrates one example of the signal analysis performed in a digital signal processor during a multi-channel self-test of the RF transceiver of FIG. 5.

FIG. 6 illustrates, by means of a block diagram, one example of evaluating (using DSP 15) the down-converted, filtered, and digitized signals $S_{RXDIG,1}$, $S_{RXDIG,2}$, etc, which can be regarded as digital output signals of the receive channels CH1, CH2, etc. The signals $S_{RXDIG,1}$, $S_{RXDIG,2}$, etc. are evaluated to assess whether the information, which is present in the signals and which relates to the test signal $S_{TEST}$, match specific criteria. In the previous example of FIG. 3, the mentioned information is the signal power, while the respective criterion used in the self-test is that the signal power has to exceed a defined threshold level.

In the present example, a spectral analysis of the digital signal $S_{RXDIG}$ is performed to evaluate the phases of the signals $S_{RXDIG,1}$, $S_{RXDIG,2}$, etc. This may be done using a Fast Fourier Transform (FFT) algorithm (labelled "spectral analysis 41" in FIG. 6) to obtain the phases $\phi_1(f)$, $\phi_2(f)$ and (optionally) magnitudes $A_1(f)$, $A_2(f)$ of the signals $S_{RXDIG1}$, $S_{RXDIG2}$ for different frequency ranges (often referred to as "bins"). Alternatively, other algorithms (e.g., a Goertzel algorithm) may be used for determining the phases $\phi_1(f)$, $\phi_2(f)$ of one or more specific spectral components of the signals $S_{RXDIG1}$, $S_{RXDIG2}$. In the present example, the frequency bins including the test frequency $f_{TEST}$ of the test signal $S_{TEST}$ is considered in the subsequent signal processing. In the present example, the digital signal processor in configured (i.e. programmed with appropriate software) to calculate the phases $\phi_1(f_{TEST})$, $\phi_2(f_{TEST})$ of the digital output signal $S_{RXDIG,1}$, and $S_{RXDIG,2}$ of each channel CH1, CH2 and to calculate the phase difference $\Delta\phi(f_{TEST})=|\phi_2(f_{TEST})-\phi_1(f_{TEST})|$. The phases are evaluated for the frequency $f_{TEST}$ of the test signal $S_{TEST}$ (see also FIGS. 3 and 4 and related description). In case the phase difference $\Delta\phi(f_{TEST})$ is more than a predefined threshold $\Delta\phi_{TH}$ the self-test will end with a negative result and an error may be signaled. For example, the negative result may be communicated to a control unit, which controls the operation of the overall system and signaled to the user (e.g. the driver of the vehicle in case of an automotive radar used in an adaptive cruise control system).

In case of a system with more than two channels CHi (i=1, 2, 3, . . . ) the respective phase value $\phi_i(f_{TEST})$ may be determined for each digital output signal $S_{RXDIG,1}$, and respective phase differences $\Delta\phi_i(f_{TEST})=|\phi_i(f_{TEST})-\phi_{ref}|$ may be calculated and compared with respective threshold values. The reference phase $\phi_{ref}$ may be, for example, the phase $\phi_1(f_{TEST})$ of the first channel CH1 or the phase $\phi_{i-1}(f_{TEST})$ of the neighboring channel. Additional to the evaluation of the phases, the magnitudes $A_i(f_{TEST})$ may be evaluated for each channel CHi as explained for the previous example of FIGS. 3 and 4.

Although the disclosure has been illustrated and described with respect to one or more implementations, alterations and/or modifications may be made to the illustrated examples without departing from the spirit and scope of the appended claims. In particular regard to the various functions performed by the above described components or structures (units, assemblies, devices, circuits, systems, etc.), the terms (including a reference to a "means") used to describe such components are intended to correspond—unless otherwise indicated—to any component or structure, which performs the specified function of the described component (e.g., that is functionally equivalent), even though not structurally equivalent to the disclosed structure, which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:
1. An RF receiver device, comprising:
a chip package;
a semiconductor chip included in the chip package;
a test signal generator integrated in the semiconductor chip, the signal generator configured to generate an RF test signal including first information;

an RF receive channel including an RF receiver circuit integrated in the semiconductor chip and having an input configured to receive an RF input signal, and further configured to down-convert the RF input signal into an intermediate frequency (IF) or base band and to digitize the down-converted signal, thus providing a digital signal;
wherein the RF receive channel further comprises a coupler integrated in the chip package and having a first input port and a second input port and an output port, wherein the output port is coupled to the input of the RF receiver circuit, the first input port is configured to receive an antenna signal, and the second input port is coupled to the test signal generator and configured to receive the test signal; and
a signal processor integrated in the semiconductor chip, wherein the signal processor is configured to determine, during a test cycle, whether the first information present in the digital signal matches a predetermined criterion.

2. The RF receiver device of claim 1,
wherein the coupler is configured to direct the RF test signal and an antenna signal, as the RF input signal, to the RF receiver circuit.

3. The RF receiver device of claim 1, wherein the RF receiver circuit further comprises:
a mixer configured to receive the RF input signal from the coupler and down-convert the input signal from an RF band to the IF band or the base band.

4. The RF receiver device of claim 3, wherein the RF receiver circuit further comprises:
a filter coupled downstream of the mixer.

5. The RF receiver device of claim 3, wherein the RF receiver circuit further comprises:
an analog-to-digital converter coupled downstream of the mixer and providing the digital signal.

6. The RF receiver device of claim 1, wherein the test signal generator comprises a modulator configured to modulate an RF oscillator signal with a test signal to generate the RF test signal, the test signal including the first information.

7. The RF receiver device of claim 6, wherein the RF oscillator signal is used by the RF receiver circuit to down-convert the RF input signal to the base band.

8. The RF receiver device of claim 6, wherein the first information includes at least a power of the test signal within a predetermined spectral range, and wherein the signal processor is configured to calculate the power of the digital signal in the predetermined spectral range.

9. The RF receiver device of claim 1, wherein the first information includes at least a phase of the test signal for a predetermined frequency range.

10. The RF receiver device of claim 1, further comprising:
at least one further receive channel, each one configured to receive a further antenna signal and provide a corresponding down-converted and digitized signal as a further digital signal.

11. The RF receiver device of claim 10,
wherein the first information includes at least a phase of the test signal for a predetermined frequency range, and
wherein the signal processor is configured to calculate a phase value of each digital signal obtained from the receive channels.

12. The RF receiver device of claims 11,
wherein the signal processor is configured to calculate phase differences from the phase values and compare the phase differences with respective threshold values.

13. The RF receiver device of claim 1, wherein the test cycle is scheduled during an idle cycle of the RF receiver circuit.

14. The RF receiver device of claim 8, wherein an error is signaled when the calculated power does not reach a predetermined threshold.

15. The RF receiver device of claim 12, wherein an error is signaled when the calculated phase differences do exceed the respective threshold values.

16. An RF receiver device, comprising:
a chip package;
a semiconductor chip included in the chip package;
test signal generator integrated in the semiconductor chip;
the signal generator configured to generate an RF test signal including first information; and
at least two RF receive channels, each RF receive channel comprising:
an RF receiver circuit integrated in the semiconductor chip and having an input configured to receive a respective RF input signal and further configured to down-convert the RF input signal into an intermediate frequency (IF) or base band and to digitize the down-converted signal, thus providing a digital signal; and
a coupler integrated in the chip package and having a first input port, a second input port and an output port, wherein the output port is coupled to the input of the RF receiver circuit of the respective RF receive channel, the first input port is configured to receive a respective antenna signal, and the second input port is coupled to the test signal generator to receive the RF test signal;
wherein the RF receiver device further comprises a signal processor integrated in the semiconductor chip, wherein the signal processor is configured to determine, during a test cycle, whether the first information present in the digital signals obtained from the RF receive channels match respective criteria.

* * * * *